L. W. ANDERSEN.
BALL JOINT.
APPLICATION FILED AUG. 10, 1916.
1,232,473.
Patented July 10, 1917.
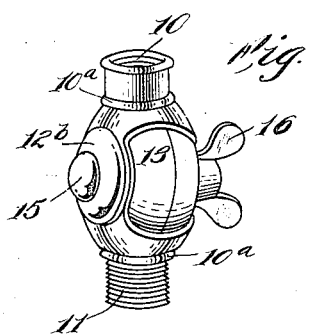
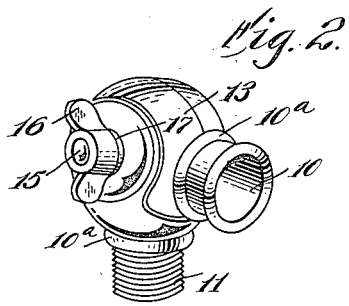
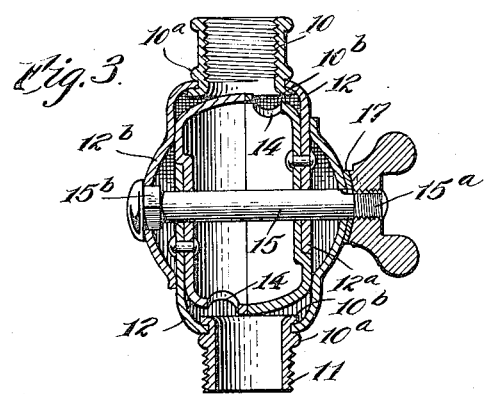
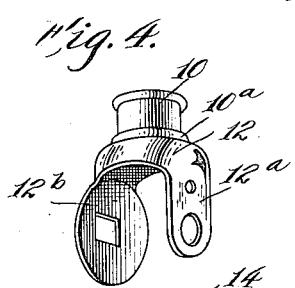
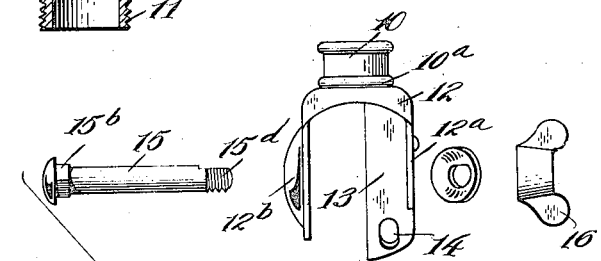
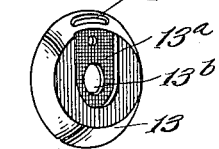
Inventor,
L. W. Andersen.
By Hull Smith Brock & West
Attys.

UNITED STATES PATENT OFFICE.

LAURITZ W. ANDERSEN, OF WATERBURY, CONNECTICUT.

BALL-JOINT.

1,232,473.    Specification of Letters Patent.    Patented July 10, 1917.

Application filed August 10, 1916. Serial No. 114,108.

*To all whom it may concern:*

Be it known that I, LAURITZ W. ANDERSEN, a citizen of the United States, residing at Waterbury, in the county of New Haven and State of Connecticut, have invented certain new and useful Improvements in Ball-Joints, of which the following is a full, clear, and exact description, reference being had to the accompanying drawings.

This invention relates generally to electric light fixtures and more particularly to a ball joint for such fixture.

The object of the invention is to provide a ball joint particularly adapted for adjustable lamps and which shall be exceedingly simple in construction and highly efficient and durable in operation.

With these and other objects in view which will become apparent as the description proceeds the invention may be described as consisting of the novel features of the various parts and the manner of combining or arranging the same hereinafter more fully described and pointed out in the claims.

In the drawing forming a part of this specification I have shown one embodiment of my invention in which Figure 1 is a perspective view showing the parts in extended position; Fig. 2 is a similar view showing the parts in folded or angular position; Fig. 3 is a vertical sectional view; Fig. 4 is a view of the nipple or bushing with strap attached; Fig. 5 is a view of the shell disconnected from said strap; and Fig. 6 is a view showing the two halves of the joint disconnected.

In the practical embodiment of my invention I employ the nipples or bushings 10 and 11, the nipple or bushing 10 having an interior thread and the nipple or bushing 11 having an exterior thread. Each nipple or bushing has a strap or yoke 12 connected thereto, this being preferably accomplished by forming the nipple or bushing with a shoulder 10$^a$ and rolling over the end of said nipple or bushing as shown at 10$^b$ thereby securely connecting the strap or yoke to the nipple or bushing. The strap or yoke has two substantially parallel members 12$^a$ and 12$^b$, the member 12$^a$ being straight and flat while the member 12$^b$ is concavo convex as shown. The member 12$^a$ has a round aperture near its free end and the member 12$^b$ has a centrally disposed polygonal shaped aperture. Connected to each member 12$^a$ is a shell 13, said shell having a depressed or recessed portion 13$^a$ to receive the member 12$^a$ and the shell and member may be connected by means of a rivet passing through the same or they may be soldered or otherwise secured and it will be noted that the shell has a central opening 13$^b$ which alines with the opening in the member 12$^a$ and in addition has a slot or elongated opening 14 through which the conductor wire passes.

After the shells 13 have been united to the straps or yokes 12 the two similar sections of the ball joint are placed together as shown, the inner edges of the shells contacting with each other and the sections are then securely fastened together by means of the stud or pin 15 having a threaded end 15$^a$ upon which is screwed the winged nut 16, a concavo convex washer 17 being preferably interposed between the winged nut and the concavo convex portion 12$^b$. The stud 15 has a squared shoulder 15$^b$ adjacent the head thereof which fits into the polygonal shaped opening in the member 12$^b$.

A ball joint constructed as herein shown and described can be quickly and easily adjusted without loosening the thumb nut as the parts turn freely and still there is sufficient friction to maintain the sections in their adjusted position. The shells 13 conceal and protect the conductor wires which pass through the nipples or bushings and through the slot or elongated openings 14 and these openings being made with smooth edges there is no likelihood whatever of the insulation being injured and short circuiting produced, and by constructing the joint in the manner herein shown and described interior guards for the conductor wires are dispensed with.

Having thus described my invention, what I claim is:

1. A joint for electrical fixtures consisting of two similar sections and means for pivotally connecting said sections, each section comprising a nipple, a strap rigidly connected to said nipple, said strap having a straight member and a concavo convex member.

2. A joint for electrical fixtures consisting of two similar sections pivotally connected together, each section comprising a nipple or bushing, a strap rigidly connected to said nipple or bushing, and a shell attached to one member of said strap, said shells being adapted to contact when the sections are united.

3. A joint for electrical fixtures consisting of two similar sections and means for pivotally connecting said sections, each section comprising a nipple, a strap rigidly connected to said nipple, said strap having a straight member and a concavo convex member, and a shell connected to the straight member of said strap.

4. A joint for electrical fixtures consisting of two similar sections and means for pivotally uniting them, each section comprising a nipple, a strap rigidly connected to said nipple, said strap having a straight member and a concavo convex member, a shell rigidly attached to the straight member, said shell having an opening adjacent the nipple for the purpose set forth.

5. A joint for electrical fixtures composed of two sections, each section comprising a nipple, a strap rigidly connected thereto, said strap having a straight member and a concavo convex member, a shell rigidly connected to the straight member, said shell having an opening adjacent the nipple, said shells being adapted to contact with each other, a stud passing through the strap members and shell, and a nut attached to said stud for the purpose set forth.

In testimony whereof, I hereunto affix my signature in the presence of two witnesses.

LAURITZ W. ANDERSEN.

Witnesses:
E. A. GODFREY,
ELMER W. ANDERSEN.